(12) United States Patent
Nagulapalli et al.

(10) Patent No.: US 11,995,004 B2
(45) Date of Patent: May 28, 2024

(54) METHODS AND SYSTEMS FOR USING A PACKET PROCESSING PIPELINE TO ACCELERATE INFINIBAND ADMINISTRATIVE OPERATIONS

(71) Applicant: Pensando Systems Inc., Milpitas, CA (US)

(72) Inventors: Harinadh Nagulapalli, San Jose, CA (US); Balakrishnan Raman, Fremont, CA (US); Murty Subba Rama Chandra Kotha, San Jose, CA (US); Nitish Bhat, San Jose, CA (US); Allen Hubbe, Durham, NC (US); Andrew Boyer, Durham, NC (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 29 days.

(21) Appl. No.: 17/138,561

(22) Filed: Dec. 30, 2020

(65) Prior Publication Data
US 2022/0206957 A1    Jun. 30, 2022

(51) Int. Cl.
*H04L 49/90*  (2022.01)
*G06F 12/1081*  (2016.01)
*G06F 15/173*  (2006.01)

(52) U.S. Cl.
CPC .... *G06F 12/1081* (2013.01); *G06F 15/17331* (2013.01); *H04L 49/90* (2013.01); *G06F 2212/657* (2013.01)

(58) Field of Classification Search
CPC .......... G06F 12/1081; G06F 15/17331; G06F 2212/657; H04L 49/90

USPC ......................................................... 709/212
See application file for complete search history.

(56) References Cited

U.S. PATENT DOCUMENTS

| | | | | |
|---|---|---|---|---|
| 7,486,689 B1 * | 2/2009 | Mott | ..................... | H04L 49/901 |
| | | | | 710/313 |
| 2004/0010545 A1 * | 1/2004 | Pandya | ................. | H04L 69/166 |
| | | | | 709/203 |
| 2004/0010612 A1 * | 1/2004 | Pandya | ..................... | H04L 9/40 |
| | | | | 709/213 |
| 2013/0097369 A1 * | 4/2013 | Talagala | .............. | G06F 12/0804 |
| | | | | 711/103 |

(Continued)

OTHER PUBLICATIONS

InfiniBrand, "InfiniBand™ Architecture Specification", vol. 1, Release 1.4, Apr. 7, 2020, 1981pgs.

*Primary Examiner* — David R Lazaro
*Assistant Examiner* — Zia Khurshid
(74) *Attorney, Agent, or Firm* — LOZA & LOZA LLP

(57) ABSTRACT

Data centers often run long lived services such as web servers that are intended to run for hours, days, or even longer before being torn down and replaced with another instance of the long-lived service. Currently, many applications are being implemented with microservice architectures that run short lived services that start up, implement an operation, and are then torn down. An aspect of starting up a service is creating administrative data structures such as InfiniBand queue pairs. A packet processing pipeline having a DMA output stage can be configured to create the administrative data structures, thereby increasing the rate at which the administrative data structures are created. As a result, services running in data centers can be started up more rapidly and efficiently.

20 Claims, 11 Drawing Sheets

(56) References Cited

U.S. PATENT DOCUMENTS

2013/0346793 A1* 12/2013 Flynn .................... G06F 3/0656
    714/6.3
2021/0409506 A1* 12/2021 Radi ....................... H04L 43/16
2022/0201075 A1*  6/2022 Zur ...................... H04L 67/1097

* cited by examiner

METHODS AND SYSTEMS FOR USING A PACKET PROCESSING PIPELINE TO ACCELERATE INFINIBAND ADMINISTRATIVE OPERATIONS

TECHNICAL FIELD

The embodiments relate to storage area networks, InfiniBand, channel adapters, computer networks, network appliances, packet processing pipelines, P4 packet processing pipelines, programmable packet processing pipelines implemented using special purpose circuitry, RDMA (remote direct memory access), and HPC (high performance computing).

BACKGROUND

High performance computing environments and data warehouses often use InfiniBand (IB) to carry data between processes, computers, and storage devices. InfiniBand is a computer networking communications standard that is published and maintained by the InfiniBand Trade Association. Two consumers connected via InfiniBand each have a queue pair (QP), with each QP having a receive queue and a send queue. Modern data centers can have tens of thousands of computers, each running many virtual machines or other processes. Those processes may communicate with another use InfiniBand QPs, and in particular using InfiniBand RDMA data operations. InfiniBand's RDMA capabilities, including RDMA over ethernet (RoCE v1 and RoCE v2), are specified and described in: "The InfiniBand Architecture Specification Volume 1, Release 1.4" published by the InfiniBand Trade Association on Apr. 7, 2020 ("the InfiniBand Specification").

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include configuring a packet processing pipeline having a DMA output stage (direct memory access output stage) to create a RDMA administrative data structure (remote DMA administrative data structure) for an InfiniBand channel adapter, and creating, by the packet processing pipeline, the data structure in a memory via the DMA output stage.

Another aspect of the subject matter described in this disclosure can be implemented by a channel adapter having a memory, and a packet processing pipeline having a DMA output stage (direct memory access output stage). The channel adapter can be configured to create a RDMA administrative data structure (remote DMA administrative data structure) in the memory via the DMA output stage.

Yet another aspect of the subject matter described in this disclosure can be implemented by a system. The system can include a means for a packet processing pipeline to use a DMA means for administering RDMA data operations.

In some implementations of the methods and devices, creating the RDMA administrative data structure includes creating an InfiniBand queue pair. In some implementations of the methods and devices, creating the RDMA administrative data structure includes creating a work request queue for work requests submitted by a requester accessing a channel adapter. In some implementations of the methods and devices, the RDMA administrative data structure provides a mapping from virtual addresses to physical addresses.

In some implementations of the methods and devices, creating the RDMA administrative data structure includes creating a local key structure. In some implementations of the methods and devices, creating the RDMA administrative data structure includes creating a remote key structure. In some implementations of the methods and devices, the memory is a main memory of a network interface card that includes the packet processing pipeline. In some implementations of the methods and devices, a network interface card that includes the packet processing pipeline is installed in a host computer and the memory is a host computer memory.

In some implementations of the methods and devices, the method also includes queueing an RDMA administrative operation for the packet processing pipeline, wherein the packet processing pipeline executes the RDMA administrative operation to create the RDMA administrative data structure, and based on a QoS (quality of service) value, the RDMA administrative operation has a higher priority than a RDMA (remote DMA) data operation. In some implementations of the methods and devices, a network interface card that includes the packet processing pipeline is installed in a host computer and the packet processing pipeline is configured to create a second RDMA administrative data structure in a host computer memory.

In some implementations of the methods and devices, the channel adapter is configured to provide an input queue for the packet processing pipeline, a RDMA administrative operation is placed on the input queue after a RDMA data operation is placed on the input queue, and, based on a quality of service value, the packet processing pipeline executes the RDMA administrative operation before executing the RDMA data operation. In some implementations of the methods and devices, the DMA means for administering the RDMA data operations creates InfiniBand queue pairs.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
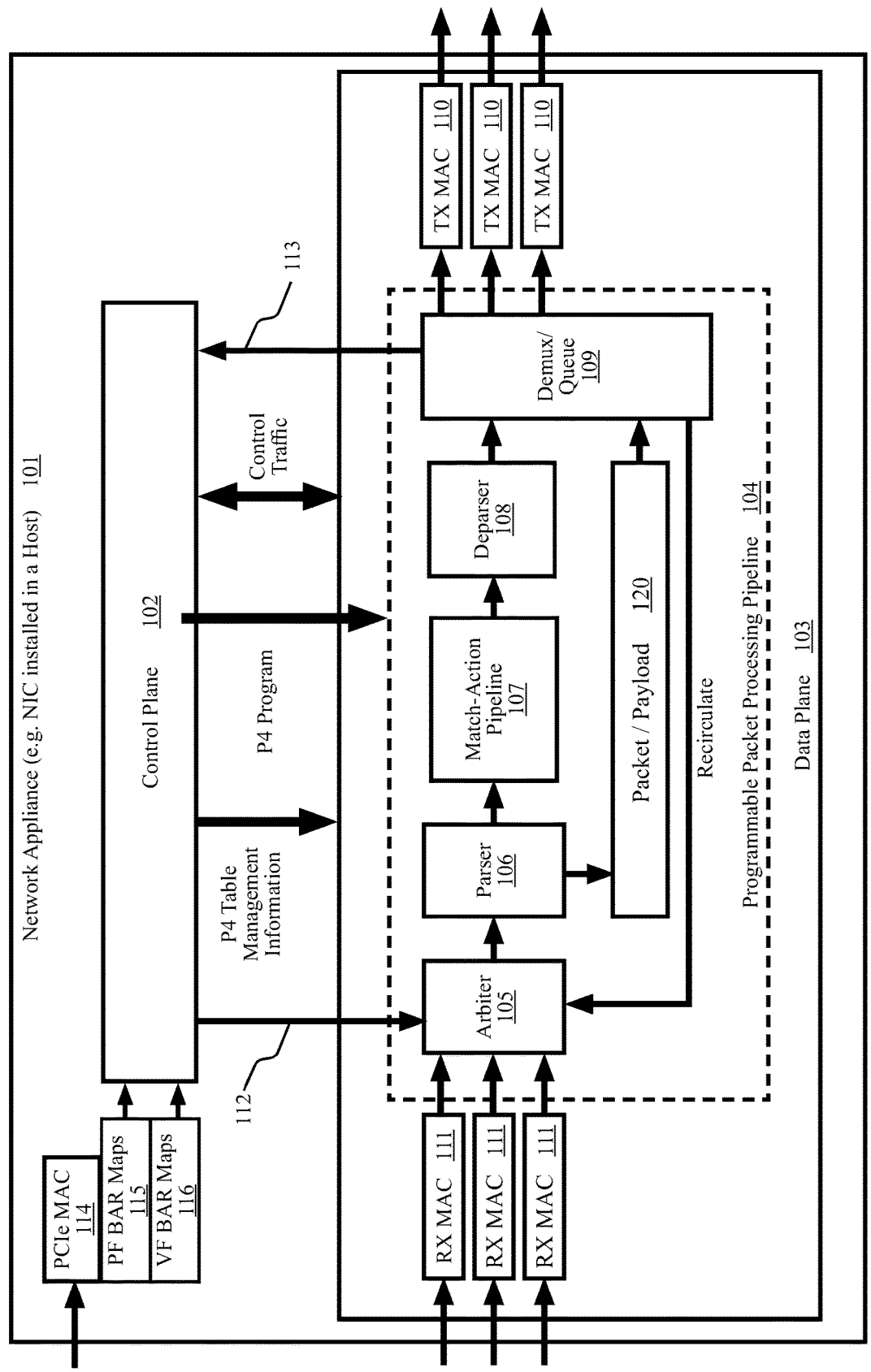
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

InfiniBand was created as a mechanism for extremely fast and low latency data transfers with low CPU overhead. In particular RDMA (remote direct memory access) provides for one process to write data directly into the memory space of another process with few, if any, intermediate copying steps. RDMA proved itself in computing environments running large scale simulations and similarly compute intensive workloads. Over time, InfiniBand and RDMA have moved to the data center and have evolved to use Internet Protocol (IP) to carry InfiniBand PDUs (protocol data units) between computers separated by IP routers and switches. The microservice architectures currently evolving in data centers have placed new demands on InfiniBand. In particular, microservices launch, run, and end. As such, the administrative data structures (e.g. queue pairs) for each microservice must rapidly be created. It is not uncommon for a data center to create thousands of QPs (queue pairs) per second and to delete them just as quickly. This is a use case that was previously unimagined and InfiniBand administrative operations are consuming an ever-increasing number of CPU cycles.

Certain network hardware is capable of offloading many InfiniBand administrative operations from the CPUs. In particular, packet processing pipelines having DMA output stages can create many InfiniBand administrative data structures and can write those data structures directly to memory. In the past, the CPUs performed this operation. The advantages of using a packet processing pipeline to accelerate InfiniBand administrative operations include speed. The number of QPs that can be created per second is increased by orders of magnitude. Another advantage is that the CPUs are freed to perform other operations, thereby yielding even further improvements in data center efficiency and throughput.

In the field of data networking, the functionality of network appliances such as switches, routers, and network interface cards (NICs) are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O and InfiniBand traffic flows, extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101, such as a NIC, can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. In an embodiment, the MAC protocol is Ethernet and the RX MACs are configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. In an embodiment, the TX MACs are configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload 120 may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A NIC 101 can have a PCIe (peripheral component interconnect extended) interface such as PCIe MAC (media access control) 114. A PCIe MAC can have a BAR (base address register) at a base address in a host system's memory space. Processes, typically device drivers within the host system's operating system, can communicate with the NIC via a set of registers beginning with the BAR. Some PCIe devices are SR-IOV (single root input output virtualization) capable. Such PCIe devices can have a PF (physical function) and multiple virtual functions (VFs). A PF BAR map 115 can be used by the host machine to communicate with the PCIe card. A VF BAR map 116 can be used by a VM running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as RDMA transfers to other VMs running on the same or other host computers.

Figure 2:
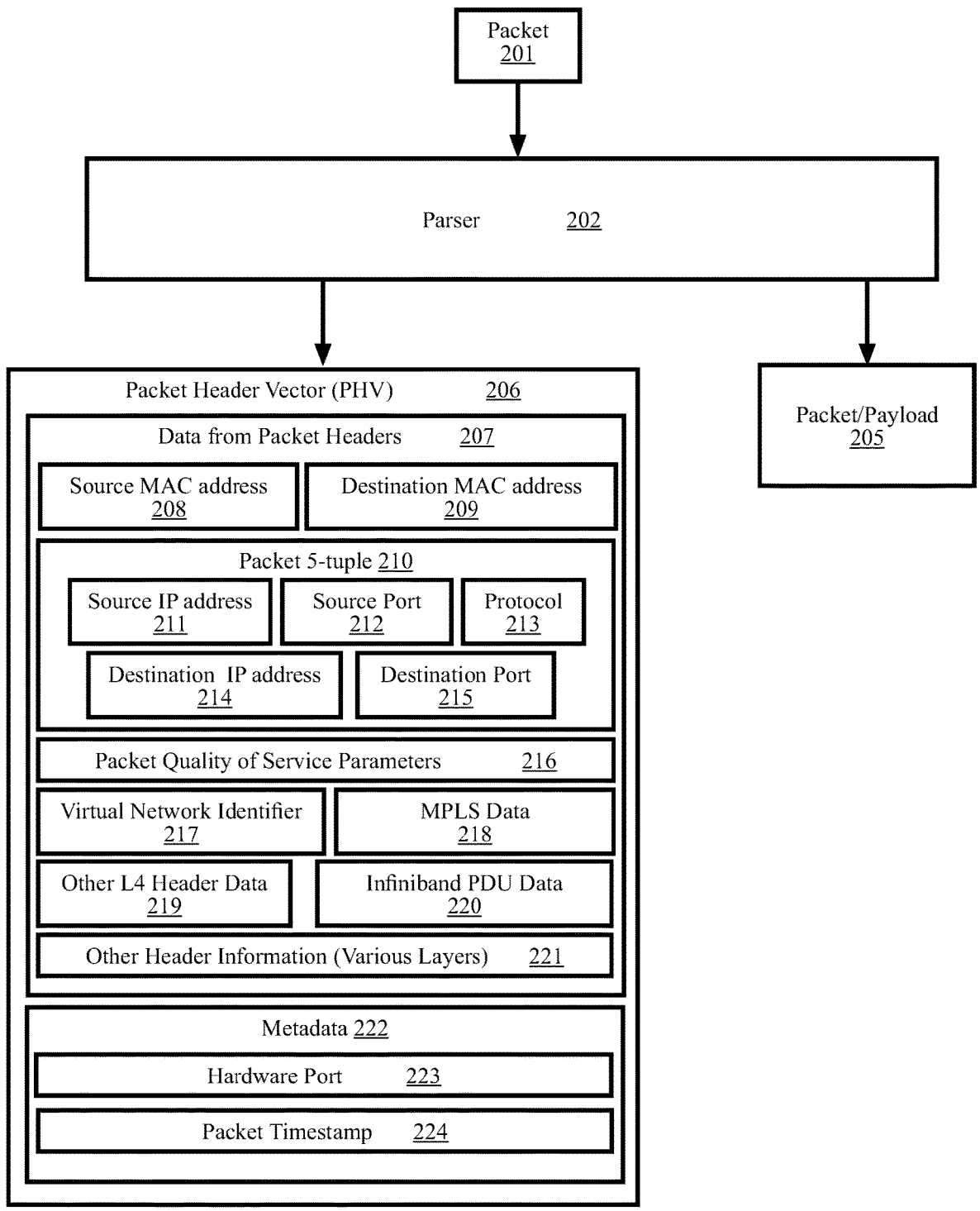
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The InfiniBand PDU (protocol data unit) data 220 can be obtained from the packet's layer 7 header and layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205.

Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in protocols such as InfiniBand realize that the data packets communicated among InfiniBand consumers also have well defined and standardized formats. As such, InfiniBand packets, PDUs, and packet headers can be easily created and processed by a programmable data plane such as the data plane of a P4 programmable NIC. Specifically, the parser can parse InfiniBand packets and PDUs, the match-action pipeline can process InfiniBand packets and PDUs, the deparser can assemble InfiniBand packets and PDUs, the demux/queue can assemble InfiniBand packets and PDUs, and the network appliance or NIC can send and receive InfiniBand packets and PDUs.

Figure 3:
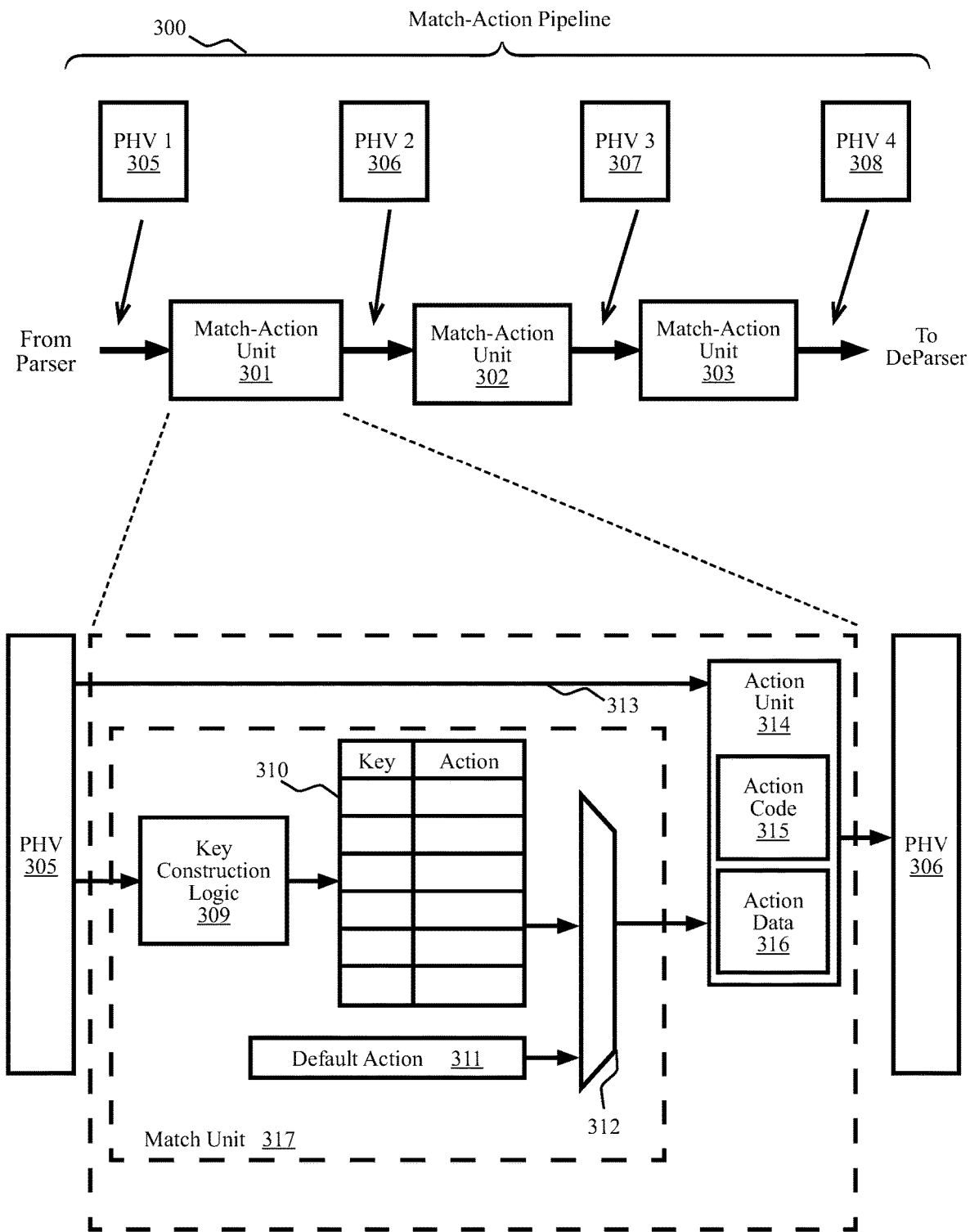
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV. The lookup table 310 is populated with key-action pairs, where a key-action pair can include a key (e.g., a lookup key) and corresponding action code 315 and/or action data 316. In an embodiment, a P4 lookup table generalizes traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. In an embodiment, operations of the match-action unit are programmable in the control plane via P4 and the contents of the lookup table is managed by the control plane.

Figure 4:
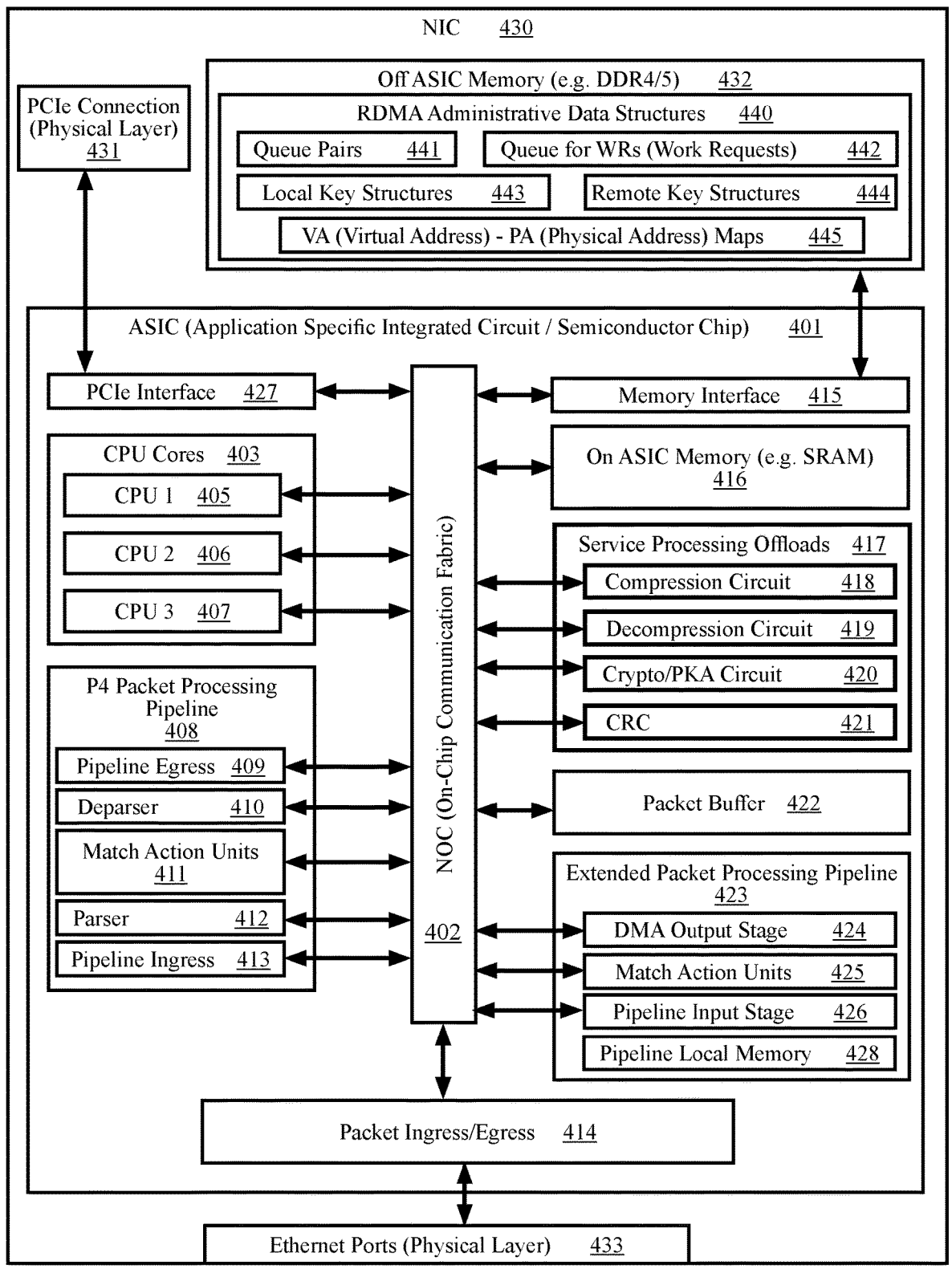
FIG. 4 is a functional block diagram of a NIC (network interface card) having an ASIC (application specific integrated circuit), according to some aspects.

FIG. 4 is a functional block diagram of a NIC (network interface card) 430 having an ASIC (application specific integrated circuit) 401, according to some aspects. The NIC 430 includes a PCIe connection 431, off ASIC memory 432, and ethernet ports 433. The PCIe connection provides for installing the NIC in a host computer having a PCIe bus. The off ASIC memory 432 can be one of the widely available memory modules or chips such as DDR4 SDRAM (double data rate 4 synchronous dynamic random-access memory) such that the ASIC has access to many gigabytes of memory on the NIC 430. The ethernet ports 433 provide physical connectivity to a computer network such as the internet.

The ASIC 401 is a semiconductor chip having many core circuits interconnected by an on-chip communications fabric, sometimes called a NOC (network on a chip) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g. SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter and of a network appliance that processes network traffic flows carried by IP (internet protocol) packets.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The NIC 430 can include a memory 432 for running Linux or some other operating system, for storing InfiniBand data structures such as RDMA administrative data structures 440, for storing large data structures such as flow tables and other analytics, and for providing buffering resources for advanced features including TCP termination and proxy, deep packet inspection, storage offloads, and connected FPGA functions. The CPU cores 403 can be general purpose processor cores, such as ARM processor cores, MIPS processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU cores 403 also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 417 are specialized hardware modules purposely optimized to handle specific tasks at wire speed, such as cryptographic functions, compression/decompression, etc.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

The ASIC 401 is illustrated with a P4 packet processing pipeline 408 and an extended packet processing pipeline 423. The extended packet processing pipeline is a packet processing pipeline that has a DMA output stage 424. The extended packet processing pipeline has match action units 425 that can be arranged as a match action pipeline such as match action pipeline 300. The extended packet processing pipeline has a pipeline input stage 426 that can receive PHVs or directives to perform operations. The extended packet processing pipeline has a pipeline local memory 428 that can be quickly accessed by the DMA output stage 424, match action units 425, and pipeline input stage 426. For example, metadata in the PHV can indicate that the PHV is a directive for implementing an RDMA administrative operation. The key construction logic 309 of the MPUs can use the metadata to form a key that indexes into a lookup table 310 to locate an action. The MPUs can thereby execute actions that assemble a RDMA administrative data structure in the pipeline local memory that can then be written to the memory 432 by the DMA output stage 424.

Synchronization primitives can ensure that memories are not changed or corrupted during critical operations. The ASIC 401 can implement synchronization primitives such as semaphores, locked tables, and atomic counters. The synchronization primitives can be used during the DMA operation to lock the pipeline local memory (or a portion thereof) and to lock the off ASIC memory (or a portion thereof) to thereby ensure that concurrently running processes (e.g. other MPU activity) do not corrupt the RDMA administrative data structure being written to the off ASIC memory.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

The memory 432 can contain executable code and data such as InfiniBand RDMA administrative data structures 440. The InfiniBand RDMA administrative data structures 440 can include QPs (queue pairs) 441, queues for WRs (work requests) (a.k.a. WR queues), local key structures 443, remote key structures 444, and VA (virtual address)-PA (physical address) maps 445. Those familiar with InfiniBand channel adapter configuration and administration are familiar with data structures and executable code that implement the InfiniBand RDMA administrative data structures 440.

The memory can store executable code that can be executed by the CPU cores to implement an InfiniBand channel adapter and to configure a packet processing pipeline to implement aspects of an InfiniBand channel adapter.

For example, the extended packet processing pipeline can be configured to create InfiniBand RDMA administrative data structures 440 in memory 432.

Figure 5:
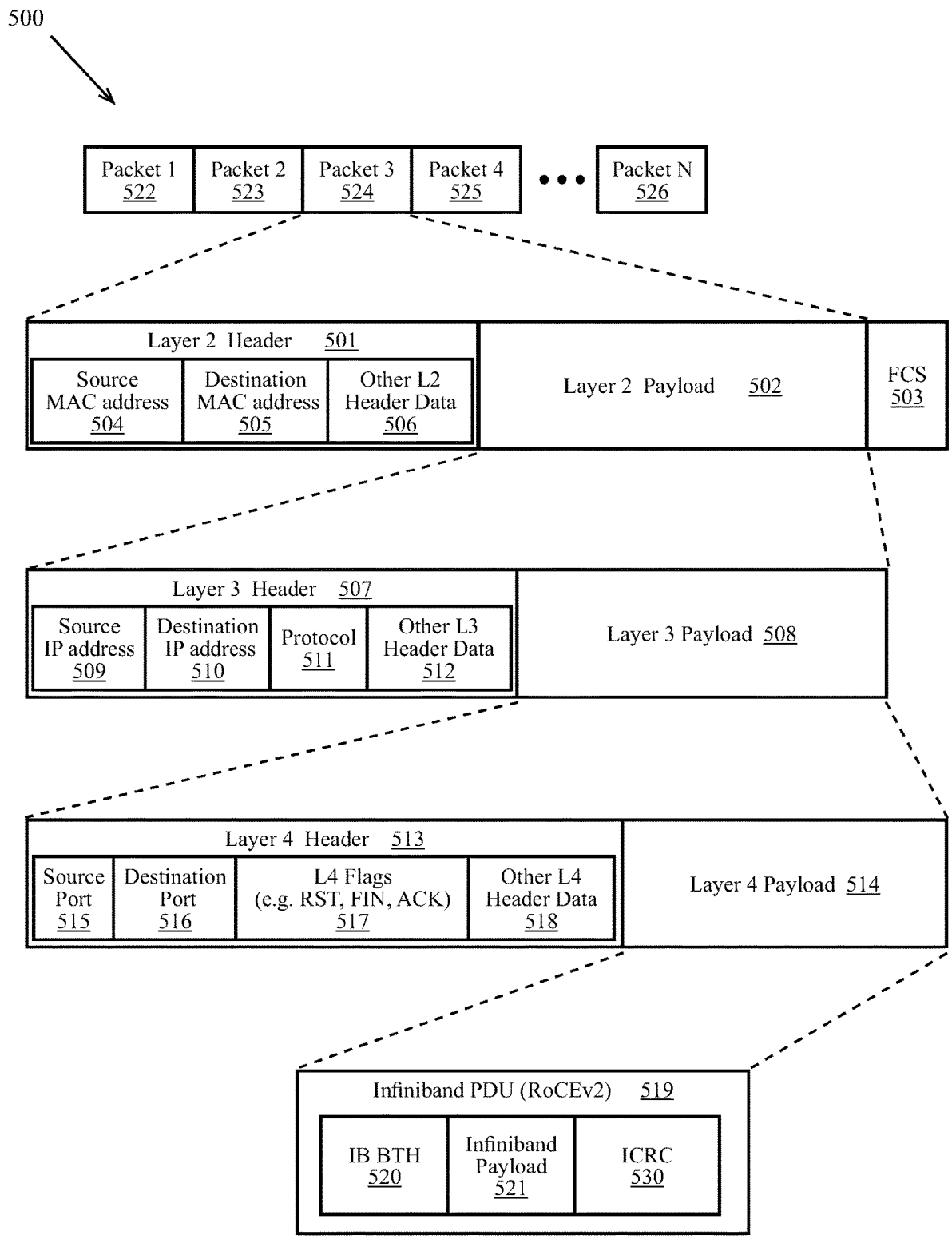
FIG. 5 illustrates packet headers and payloads of packets for network traffic flows including InfiniBand PDUs according to some aspects.

FIG. 5 illustrates packet headers and payloads of packets for network traffic flows 500 including InfiniBand PDUs according to some aspects. A network traffic flow 500 can have numerous packets such as a first packet 522, a second packet 523, a third packet 524, a fourth packet 525, and a final packet 526 with many more packets between the fourth packet 525 and the final packet 526. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 FCS (frame check sequence). The layer 2 header can contain a source MAC address 504, a destination MAC address 505, and other layer 2 header data 506. The input ports 111 and output ports 110 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RoCE v2 (RDMA over Converged Ethernet version 2), HTTP (Hypertext Transfer Protocol), FTP (File Transfer Protocol), SMTP (Simple Mail Transfer Protocol), and DHCP (Dynamic Host Configuration). Data coded according to application layer protocols can be encapsulated into transport layer protocol units (such as TCP or UDP messages), which in turn use lower layer protocols to effect actual data transfer.

A layer 7 packet may be an InfiniBand PDU 519 having an InfiniBand BTH (base transport header) 520, InfiniBand payload 521, and ICRC (invariant cyclic redundancy check) 530. The BTH specifies the destination QP and indicates the operation code, packet sequence number, and partition. The ICRC is a CRC covering the fields in the PDU that do not change from the source to the destination.

Figure 6:
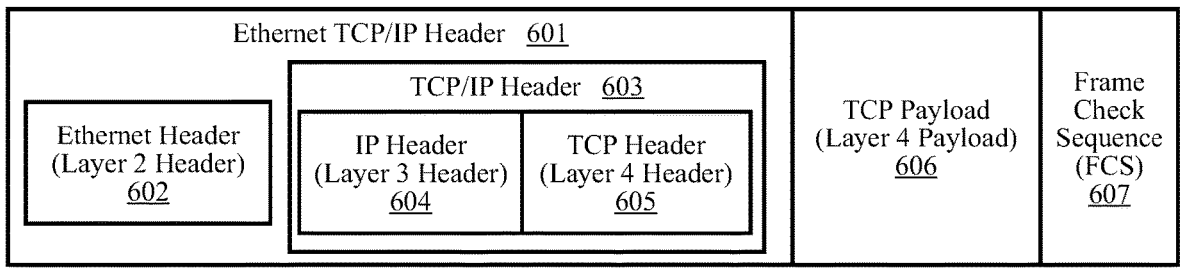
FIG. 6 illustrates an ethernet TCP/IP packet according to some aspects.

FIG. 6 illustrates an Ethernet TCP/IP packet according to some aspects. Ethernet packets, such as Ethernet TCP/IP packets, have an Ethernet header 602 and a frame check sequence (FCS) 607. As discussed above, Ethernet is a layer 2 protocol. An Ethernet TCP/IP header 601 has an Ethernet header 602 and a TCP/IP header 603. The TCP/IP header 603 has an IP header 604 and a TCP header 605. The Ethernet TCP/IP packet has a TCP payload 606 as the layer 4 payload.

Figure 7:
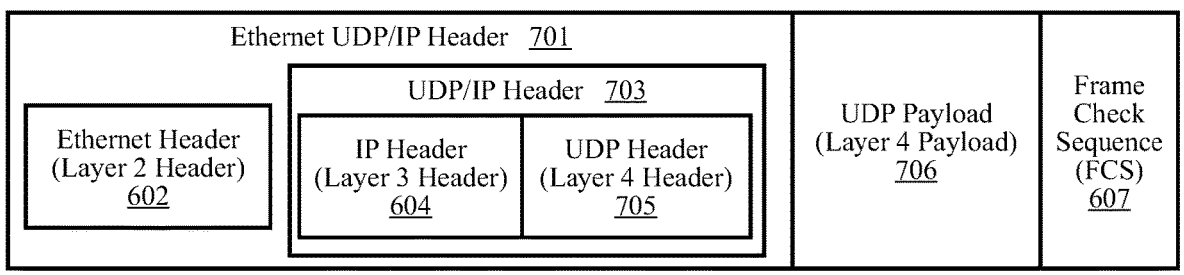
FIG. 7 illustrates an ethernet UDP/IP packet according to some aspects.

FIG. 7 illustrates an ethernet UDP/IP packet according to some aspects. An Ethernet UDP/IP packet differs from an Ethernet TCP/IP packet by having UDP as the layer 4 protocol. Ethernet UDP/IP packets, have an Ethernet header 602 and a frame check sequence (FCS) 607. An Ethernet UDP/IP header 701 has an Ethernet header 602 and a UDP/IP header 703. The UDP/IP header 703 has an IP header 604 and a UDP header 705. The Ethernet UDP/IP packet has a UDP payload 706 as the layer 4 payload.

Figure 8:
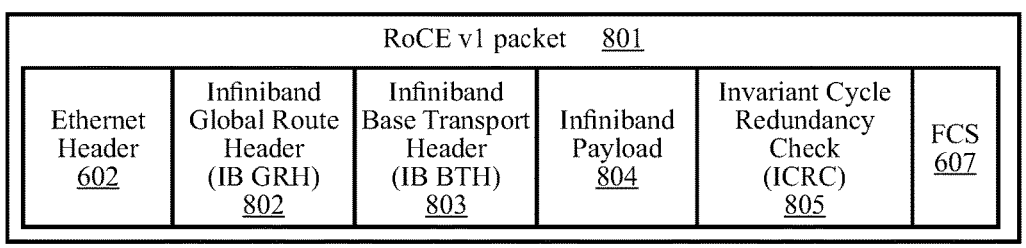
FIG. 8 illustrates a RoCE v1 (RDMA over converged ethernet, version 1) packet according to some aspects.

FIG. 8 illustrates a RoCE v1 (RDMA over converged ethernet, version 1) packet 801 according to some aspects. The format of RoCE v1 packets 801 is specified in "The InfiniBand Architecture Specification Volume 1, Release 1.4" published by the InfiniBand Trade Association on Apr. 7, 2020 ("the InfiniBand Specification"). The RoCE v1 packet 801 can be seen to be an ethernet packet having an Ethernet payload that includes an InfiniBand Global Route Header (IB GRH) 802, an InfiniBand Base Transport Header (IB BTH) 803, an InfiniBand payload 804, and an Invariant Cyclic Redundancy Check (ICRC) 805 field.

Figure 9:
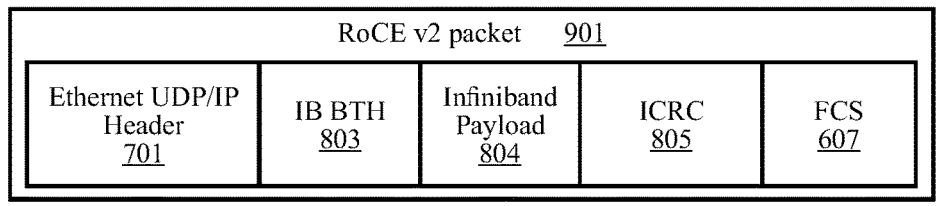
FIG. 9 illustrates a RoCE v2 (RDMA over converged ethernet, version 2) packet according to some aspects.

FIG. 9 illustrates a RoCE v2 (RDMA over converged ethernet, version 2) packet 901 according to some aspects. The format of RoCE v2 packets 901 is specified in the InfiniBand Specification. RoCE v2 packet 901 can be seen to be an Ethernet UDP/IP packet having a UDP payload that includes the IB BTH 803, the InfiniBand payload 804, and the ICRC 805. Here, Ethernet is the layer 2 transport for a UDP packet carrying the InfiniBand elements. Other layer 2 protocols may be used as the layer 2 transport.

Figure 10:
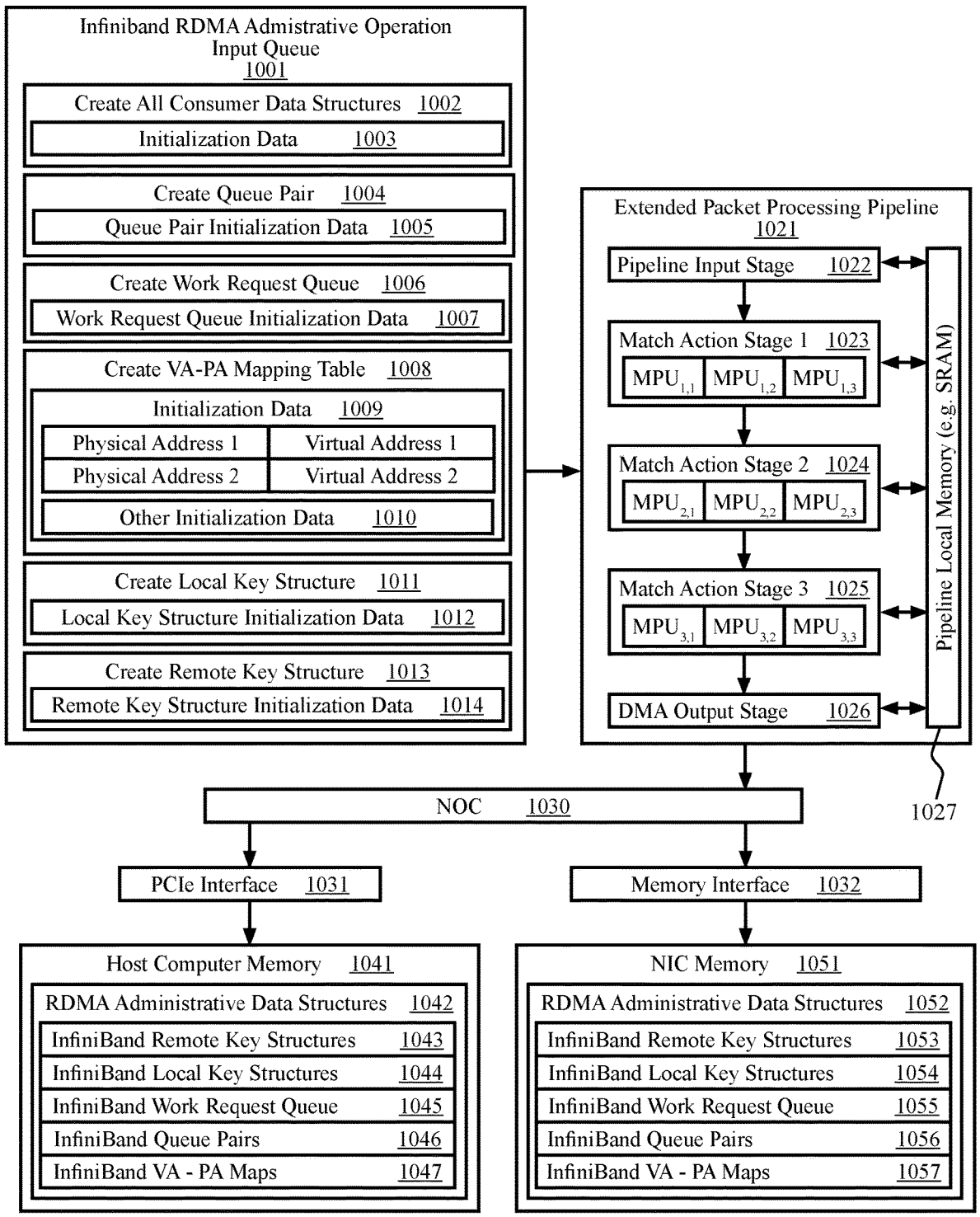
FIG. 10 is a high-level block diagram illustrating a non-limiting example of a packet processing pipeline creating RDMA administrative data structures in a memory via a DMA output stage according to some aspects.

FIG. 10 is a high-level block diagram illustrating a non-limiting example of a packet processing pipeline 1021 creating RDMA administrative data structures 1042, 1052 in a memory 1041, 1051 via a DMA output stage 1026 according to some aspects. Here, a packet processing pipeline 1021 having a DMA (direct memory access) output stage 1026 is often referred to as an extended packet pipeline 1021 in order to distinguish it from the P4 packet processing pipeline 408 illustrated in FIG. 4 that does not have a DMA output stage. The extended packet processing pipeline 1021 can have a pipeline input stage 1022, match-action stages, a DMA output stage 1026, and a pipeline local memory 1027. The match-action stages include match action stage 1 1023, match-action stage 2 1024, and match-action stage 3 1025. Each of the match-action stages can have multiple MPUs (match processing units) that may be similar to the match-action unit 301 illustrated in FIG. 3. The pipeline input stage 1022, match-action stages, and DMA output stage 1026 can use the pipeline local memory to store values and data structures such as local versions of RDMA data structures.

The extended packet processing pipeline 1021 can process incoming operations that are submitted to the extended packet processing pipeline via input queues such as InfiniBand RDMA administrative operation input queue 1001. The operations can include operations to create all consumer data structures 1002, create a queue pair 1004, create a work request queue 1006, create a VA-PA mapping table 1008, create a local key structure 1011, and create a remote key structure 1013. Each of the administrative data structures is created in the NIC memory 1051 or the host computer memory 1041. For example, the DMA output stage can write data structures to the NIC memory 1051 via the NOC 1030 and the memory interface 1032. The DMA output stage can also write data structures to the host computer memory 1041 via the NOC 1030 and the PCIe interface 1031. These write operations can be similar to those already employed for writing data received via RDMA data transfers directly to NIC or host memory. In some embodiments, data structures are created in a memory 1041, 1052 by being copied from pipeline local memory 1027 via a DMA operation using the DMA output stage 1026.

Figure 11:
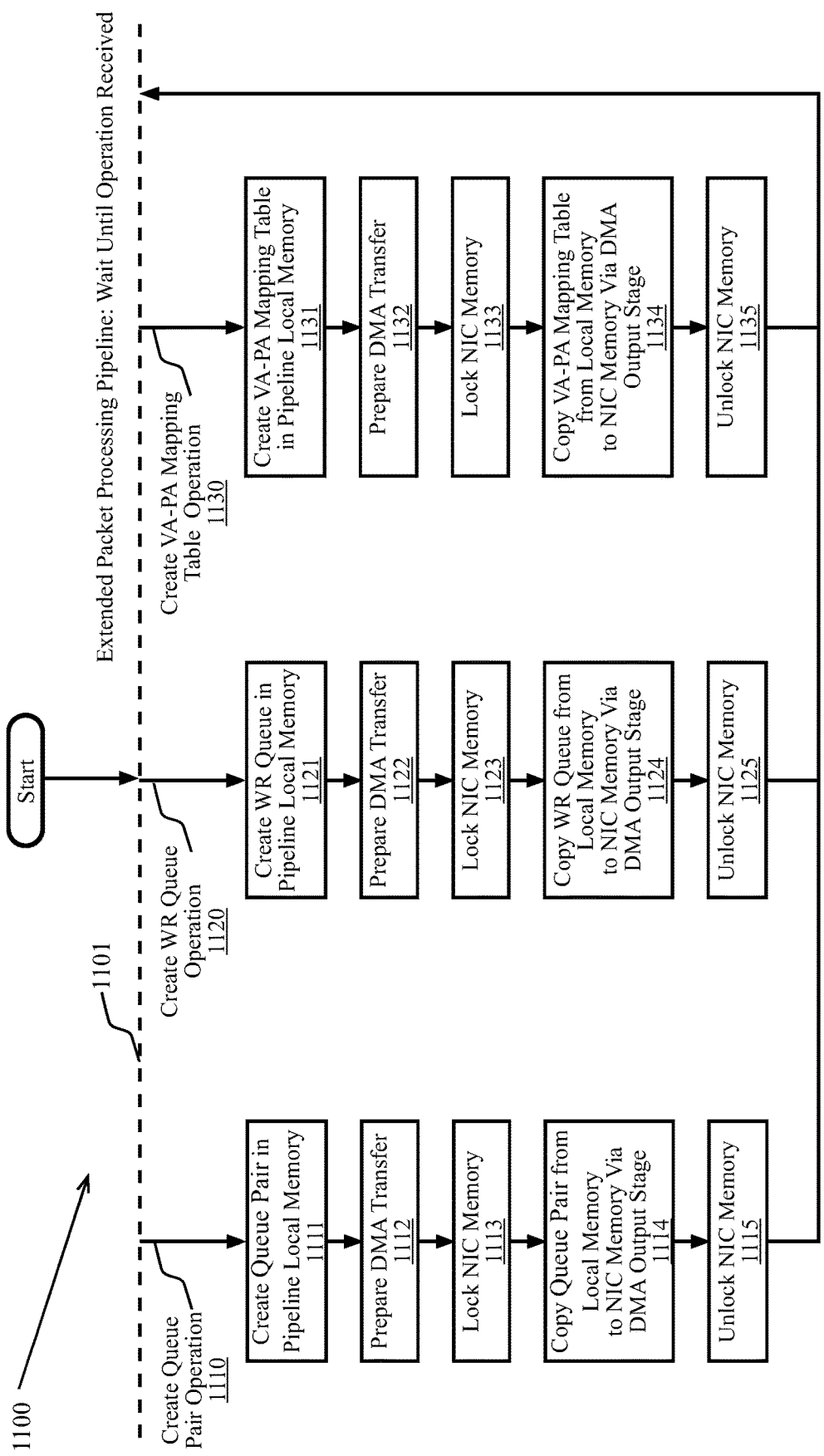
FIG. 11 is a high-level flow diagram illustrating creation of RDMA administrative data structures in a memory via a DMA output stage according to some aspects.

The operation that creates all consumer data structures 1002 can, based on initialization data 1003, create a queue pair, create a work request queue, create a VA-PA mapping table, create a local key structure, create a remote key structure, and create other administrative data structures in the NIC memory 1051 or the host computer memory 1041. The operation that creates a queue pair 1004 can, based on queue pair initialization data 1005, create a queue pair 1056 in the NIC memory 1051 or create a queue pair 1046 in the host computer memory 1041. The operation that creates a work request queue 1006 can, based on work request queue initialization data 1007, create a work request queue 1055 in the NIC memory 1051 or create a work request queue 1045 in host computer memory 1041. The operation that creates a VA-PA mapping table 1008 can, based on initialization data 1009, create a VA-PA mapping table 1057 in the NIC memory 1051 or create a VA-PA mapping table 1047 in host computer memory 1041. The VA-PA mapping table can associate physical addresses (e.g. host memory addresses) with virtual addresses (addresses with a process' virtual memory space). The operation that creates a local key structure 1011 can, based on local key structure initialization data 1012, create a local key structure 1054 in the NIC memory 1051 or create a local key structure 1044 in the host computer memory 1041. The operation that creates a remote key structure 1013 can, based on remote key structure initialization data 1014, create a remote key structure 1053 in the NIC memory 1051 or create a local key structure 10543 in the host computer memory 1041. Those familiar with InfiniBand, and in particular the InfiniBand Specification, are familiar with data structures for queue pairs, work request queues, VA-PA mapping tables, local key structures, remote key structures, and other InfiniBand administrative data structures FIG. 11 is a high-level flow diagram illustrating creation of RDMA administrative data structures in a memory via a DMA output stage 1100 according to some aspects. Here, the memory is illustrated as the NIC memory although a substantially similar process can write the data structures to the host computer memory. After starting, the process can wait 1101 until a directive is received for creating an InfiniBand administrative data structure.

If the directive is for an operation that creates a queue pair 1110, then at block 1111 the extended packet processing pipeline can create the queue pair in pipeline local memory 1027. At block 1112, the DMA output stage is prepared for a DMA transfer. At block 1113, the NIC local memory can be locked (a memory lock or memory region lock often precedes a DMA transfer). At block 1114, the DMA output stage performs the DMA operation and thereby copies the queue pair from the pipeline local memory 1027 to the NIC memory 1051. At block 1115, the NIC memory is unlocked.

The process then loops back to waiting until another directive is received for creating an InfiniBand administrative data structure.

If the directive is for an operation that creates a write request queue 1120, then at block 1121 the extended packet processing pipeline can create the write request queue in pipeline local memory 1027. At block 1122, the DMA output stage is prepared for a DMA transfer. At block 1123, the NIC local memory can be locked. At block 1124, the DMA output stage performs the DMA operation and thereby copies the write request queue from the pipeline local memory 1027 to the NIC memory 1051. At block 1125, the NIC memory is unlocked. The process then loops back to waiting until another directive is received for creating an InfiniBand administrative data structure.

If the directive is for an operation that creates a VA-PA mapping table 1130, then at block 1131 the extended packet processing pipeline can create the VA-PA mapping table in pipeline local memory 1027. At block 1132, the DMA output stage is prepared for a DMA transfer. At block 1133, the NIC local memory can be locked. At block 1134, the DMA output stage performs the DMA operation and thereby copies the VA-PA mapping table from the pipeline local memory 1027 to the NIC memory 1051. At block 1135, the NIC memory is unlocked. The process then loops back to waiting until another directive is received for creating an InfiniBand administrative data structure.

Figure 12:
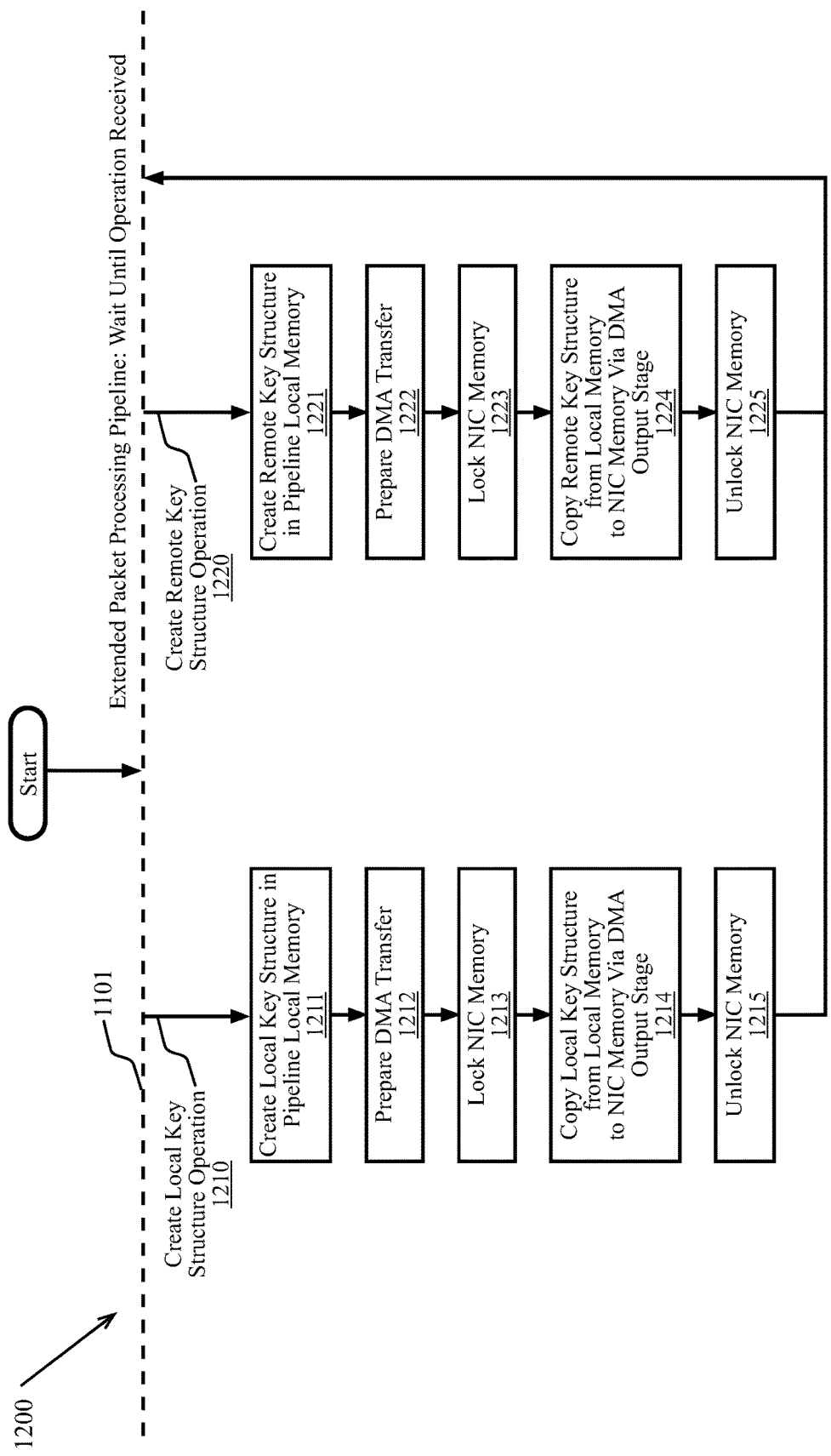
FIG. 12 is a high-level flow diagram illustrating creation of RDMA administrative local and remote key data structures in a memory via a DMA output stage according to some aspects.

FIG. 12 is a high-level flow illustrating creation of RDMA administrative local and remote key data structures in a memory via a DMA output stage 1200 according to some aspects. Here, the memory is illustrated as the NIC memory although a substantially similar process can write the data structures to the host computer memory. After starting, the process can wait 1101 until a directive is received for creating an InfiniBand administrative data structure.

If the directive is for an operation that creates a local key structure 1210, then at block 1211 the extended packet processing pipeline can create the local key structure in pipeline local memory 1027. At block 1212, the DMA output stage is prepared for a DMA transfer. At block 1213, the NIC local memory can be locked. At block 1214, the DMA output stage performs the DMA operation and thereby copies the local key structure from the pipeline local memory 1027 to the NIC memory 1051. At block 1215, the NIC memory is unlocked. The process then loops back to waiting until another directive is received for creating an InfiniBand administrative data structure.

If the directive is for an operation that creates a remote key structure 1220, then at block 1221 the extended packet processing pipeline can create the remote key structure in pipeline local memory 1027. At block 1222, the DMA output stage is prepared for a DMA transfer. At block 1223, the NIC local memory can be locked. At block 1224, the DMA output stage performs the DMA operation and thereby copies the remote key structure from the pipeline local memory 1027 to the NIC memory 1051. At block 1225, the NIC memory is unlocked. The process then loops back to waiting until another directive is received for creating an InfiniBand administrative data structure.

Figure 13:
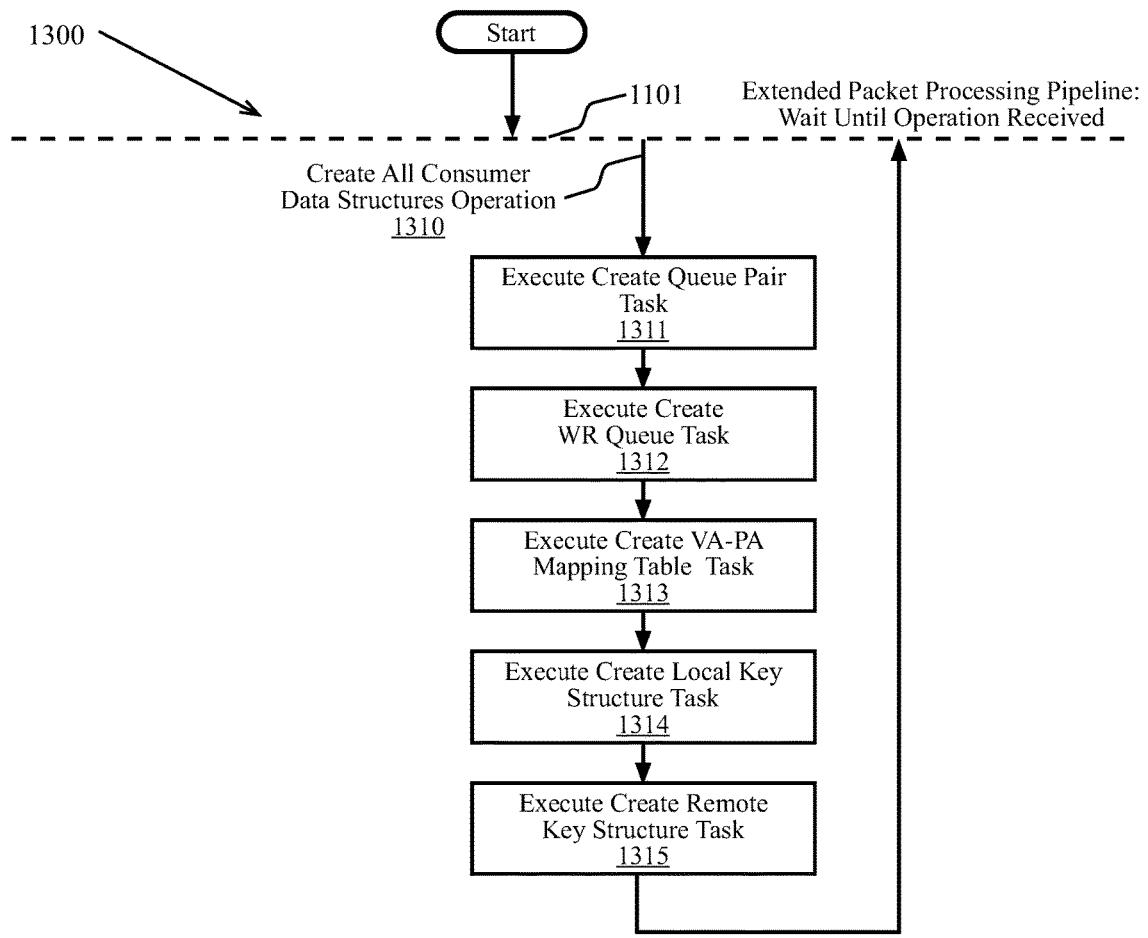
FIG. 13 is a high-level flow diagram illustrating creation of multiple RDMA administrative data structures in a memory via a DMA output stage according to some aspects.

FIG. 13 is a high-level flow diagram illustrating creation of multiple RDMA administrative data structures in a memory via a DMA output stage 1300 according to some aspects. Here, the memory is illustrated as the NIC memory although a substantially similar process can write the data structures to the host computer memory. After starting, the process can wait 1101 until a directive is received for creating an InfiniBand administrative data structure.

If the directive is for an operation that creates all consumer data structures 1310 (a consumer is a process or machine that uses InfiniBand for transferring data), then at block 1311 the extended packet processing pipeline can execute a create queue pair task such as that illustrated in FIG. 11. At block 1312 the extended packet processing pipeline can execute a create work request queue task such as that illustrated in FIG. 11. At block 1313 the extended packet processing pipeline can execute a create VA-PA mapping table task such as that illustrated in FIG. 11. At block 1314 the extended packet processing pipeline can execute a create local key structure task such as that illustrated in FIG. 12. At block 1315 the extended packet processing pipeline can execute a create remote key structure task such as that illustrated in FIG. 12. The process then loops back to waiting until another directive is received for creating an InfiniBand administrative data structure. A more efficient implementation would create all the administrative data structure in the pipeline local memory 428 and use a single DMA operation to transfer them all to NIC (or host) memory.

RDMA administrative operations are directed to creating, modifying, and deleting the RDMA administrative data structures that are used for administering RDMA data operations. The RDMA administrative data structures are used by NICs, network appliances, packet processing pipelines, and other devices in order to carry out the RDMA data operations. For example, a requestor and a responder can use queue pairs (RDMA administrative data structures) for exchanging data via a RDMA data operations.

Figure 14:
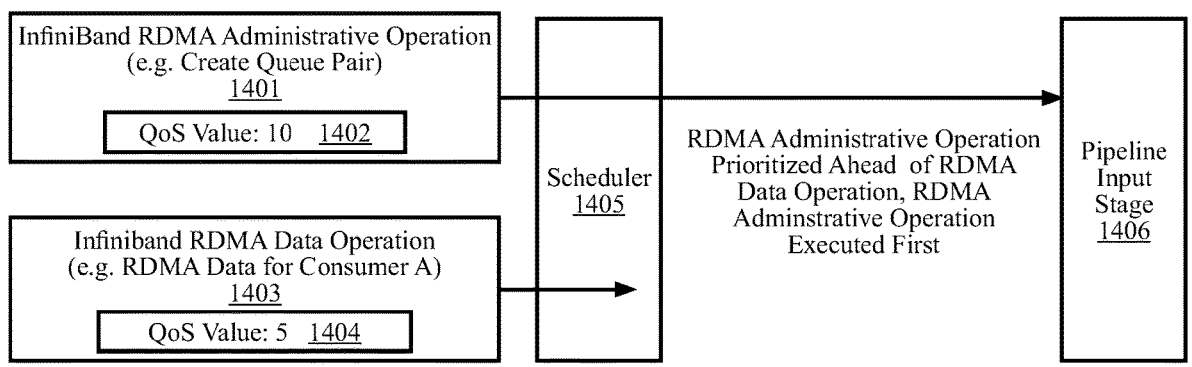
FIG. 14 is a high-level block diagram illustrating an InfiniBand RDMA administrative operation having a higher priority than an InfiniBand RDMA data operation and therefore being executed first, according to some aspects.

FIG. 14 is a high-level block diagram illustrating an InfiniBand RDMA administrative operation 1401 having a higher priority than an InfiniBand RDMA data operation 1403 and therefore being executed first, according to some aspects. The scheduler 1405 is responsible for selecting operations for execution by the extended packet processing pipeline. Each of the pending operations can be associated with a priority value or QoS (quality of service) value. For example, individual operations can be associated with QoS values. Alternatively, entire queues can be associated with QoS values such that every operation on a specific queue is associated with the QoS value associated with that queue. The scheduler 1405 preferentially schedules higher priority operations to run before lower priority operations. Note that some schedulers use lower numbers indicate higher priority whereas other schedulers use higher numbers to indicate higher priority. Those with knowledge of scheduling algorithms are well aware of the many ways that higher and lower priorities can be indicated. In the non-limiting example of FIG. 14, higher QoS values indicate higher priority.

The InfiniBand RDMA administrative operation 1401 has a QoS value 1402 of 10 whereas the InfiniBand RDMA data operation 1403 has a QoS value 1404 of 5. As such, the scheduler 1405 submits the InfiniBand RDMA administrative operation 1401 to the input stage 1406 of a packet processing pipeline having a DMA output stage before the InfiniBand RDMA data operation 1403 is submitted to the input stage 1406. Prioritizing the RDMA administrative operations at a higher priority than RDMA data operations can be critical to data center performance because starting up a service is not complete until the administrative data structures are created. The RDMA data operations (these are data transfers between consumers) can outnumber the RDMA administrative operations by orders of magnitude.

As such, giving a higher priority to RDMA administrative operations prevents starvation of administrative operation queues and tasks.

Figure 15:
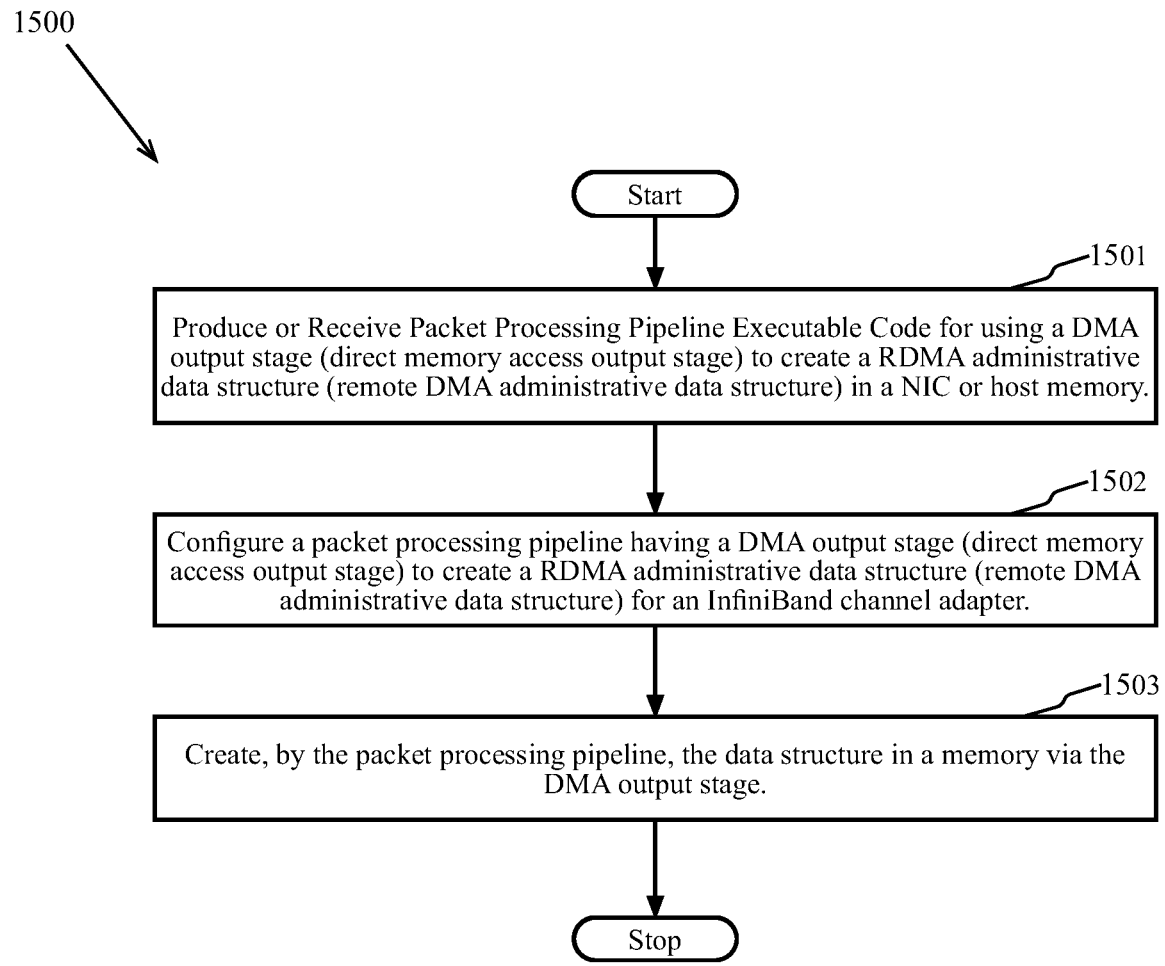
FIG. 15 is a high-level block diagram of a method for using a packet processing pipeline to accelerate InfiniBand administrative operations according to some aspects.

FIG. 15 is a high-level block diagram of a method for using a packet processing pipeline to accelerate InfiniBand administrative operations 1500 according to some aspects. After the start, at block 1501 the method can produce or receive packet processing pipeline executable code for using a DMA output stage (direct memory access output stage) to create a RDMA administrative data structure (remote DMA administrative data structure) in a NIC or host memory. At block 1502, the method can configure a packet processing pipeline having a DMA output stage (direct memory access output stage) to create a RDMA administrative data structure (remote DMA administrative data structure) for an Infini-Band channel adapter. At block 1502, the method can create, by the packet processing pipeline, the data structure in a memory via the DMA output stage.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:
1. A method comprising:
configuring a packet processing pipeline circuit that includes a plurality of match-action units in a match-action pipeline to create, in a pipeline local memory, a remote DMA (RDMA) administrative data structure for an InfiniBand channel adapter;
configuring a DMA output stage of the packet processing pipeline circuit to copy the RDMA administrative data structure from the pipeline local memory into a memory; and
configuring the match-action pipeline for processing a plurality of network traffic flows that include I/O and InfiniBand traffic flows,
wherein:
the packet processing pipeline circuit is implemented in hardware;
the DMA output stage accesses the memory via a memory interface that is implemented in the hardware;
configuring the packet processing pipeline circuit to create the RDMA administrative data structure includes configuring at least one of the match-action units in the match-action pipeline to create the RDMA administrative data structure in the pipeline local memory; and
wherein the processing of the network traffic flows includes receiving a packet of a network flow and 1) processing the packet by performing an action indicated by a flow table entry for the network flow in response to finding the flow table entry for the network flow, or 2) processing the packet by performing a default action in response to finding no flow table entry for the network flow.

2. The method of claim 1 wherein the RDMA administrative data structure includes an InfiniBand queue pair.

3. The method of claim 1, wherein the RDMA administrative data structure includes a work request queue for work requests submitted by a requester accessing a channel adapter that includes the hardware.

4. The method of claim 1, wherein the RDMA administrative data structure provides a mapping from virtual addresses to physical addresses.

5. The method of claim 1, wherein the RDMA administrative data structure includes a local key structure.

6. The method of claim 1, wherein the RDMA administrative data structure includes a remote key structure.

7. The method of claim 1, wherein the memory is a main memory of a network interface card that includes the hardware.

8. The method of claim 1, wherein:
a network interface card that includes the hardware is installed in a host computer;
the hardware uses a peripheral component interface express (PCIe) bus to access the memory; and
the memory is a host computer memory.

9. The method of claim 1 further including queueing an RDMA administrative operation for the packet processing pipeline circuit, wherein:
the packet processing pipeline circuit is configured to execute a RDMA data operation;
the packet processing pipeline circuit executes the RDMA administrative operation to create the RDMA administrative data structure; and
based on a QoS (quality of service) value, the RDMA administrative operation has a higher priority than the RDMA data operation.

10. The method of claim 1 wherein the packet processing pipeline circuit is implemented in an application specific integrated circuit (ASIC).

11. A channel adapter comprising:
a memory;
hardware that includes a packet processing pipeline circuit that includes a DMA output stage and a plurality of match-action units in a match-action pipeline; and
a pipeline local memory of the match-action pipeline,
wherein:
at least one of the match-action units on the match-action pipeline is configured to create, in the pipeline local memory, a remote DMA (RDMA) administrative data structure for an InfiniBand channel adapter;
the DMA output stage is configured to copy the RDMA administrative data structure from the pipeline local memory into the memory; and
the match-action pipeline is configured to process a plurality of network traffic flows that include I/O and InfiniBand traffic flows by receiving a packet of a network flow and 1) processing the packet by performing an action indicated by a flow table entry for the network flow in response to finding the flow table entry for the network flow, or 2) processing the packet by performing a default action in response to finding no flow table entry for the network flow.

12. The channel adapter of claim 11, wherein the RDMA administrative data structure includes an InfiniBand queue pair.

13. The channel adapter of claim 11, wherein the RDMA administrative data structure includes a work request queue for work requests submitted by a requester accessing the channel adapter.

14. The channel adapter of claim 11, wherein the RDMA administrative data structure provides a mapping from virtual addresses to physical addresses.

15. The channel adapter of claim 11, wherein the RDMA administrative data structure includes a local key structure.

16. The channel adapter of claim 11, wherein the RDMA administrative data structure includes a remote key structure.

17. The channel adapter of claim 11, wherein the memory is a main memory of a network interface card that includes the ASIC hardware.

18. The channel adapter of claim 17, wherein the network interface card includes the ASIC hardware is installed in a host computer and the packet processing pipeline circuit is configured to create a second RDMA administrative data structure in a host computer memory.

19. The channel adapter of claim 11, wherein:
the channel adapter is configured to provide an input queue for the packet processing pipeline circuit;
a RDMA administrative operation is placed on the input queue after a RDMA data operation is placed on the input queue; and
based on a quality of service value, the packet processing pipeline circuit executes the RDMA administrative operation before executing the RDMA data operation.

20. The channel adapter of claim 11 wherein the packet processing pipeline circuit is implemented in an application specific integrated circuit (ASIC).

* * * * *